United States Patent
Kim

(10) Patent No.: US 10,858,534 B2
(45) Date of Patent: Dec. 8, 2020

(54) ULTRAVIOLET CURABLE COATING COMPOSITION

(71) Applicant: KCC CORPORATION, Seoul (KR)

(72) Inventor: Won Il Kim, Seoul (KR)

(73) Assignee: KCC CORPORATION, Seoul (KR)

(*) Notice: Subject to any disclaimer, the term of this patent is extended or adjusted under 35 U.S.C. 154(b) by 42 days.

(21) Appl. No.: 16/130,400

(22) Filed: Sep. 13, 2018

(65) Prior Publication Data

US 2019/0092965 A1   Mar. 28, 2019

(30) Foreign Application Priority Data

Sep. 22, 2017   (KR) .................. 10-2017-0122262

(51) Int. Cl.
| | |
|---|---|
| *C09D 167/07* | (2006.01) |
| *C09D 175/16* | (2006.01) |
| *C09D 5/00* | (2006.01) |
| *C08F 290/06* | (2006.01) |
| *C09D 5/28* | (2006.01) |
| *C09D 151/08* | (2006.01) |
| *C09D 4/00* | (2006.01) |
| *C09D 7/65* | (2018.01) |
| *C08K 5/07* | (2006.01) |

(52) U.S. Cl.
CPC ........ *C09D 167/07* (2013.01); *C08F 290/061* (2013.01); *C08F 290/067* (2013.01); *C09D 4/00* (2013.01); *C09D 5/00* (2013.01); *C09D 5/28* (2013.01); *C09D 7/65* (2018.01); *C09D 151/08* (2013.01); *C09D 175/16* (2013.01); *C08K 5/07* (2013.01)

(58) Field of Classification Search
CPC .......... C09D 167/07; C09D 5/00; C09D 5/28; C09D 151/08; C09D 4/00; C09D 7/65; C09D 175/16; C09D 175/14; C09D 167/06; C08F 290/061; C08F 290/067; C08L 2205/025; C08L 2205/03; C08K 5/07

See application file for complete search history.

(56) References Cited

U.S. PATENT DOCUMENTS

| | | | | |
|---|---|---|---|---|
| 5,401,348 A | * | 3/1995 | Oguchi ................ | C08F 259/08 156/247 |
| 5,493,483 A | * | 2/1996 | Lake ..................... | F21S 41/37 362/346 |
| 5,571,571 A | * | 11/1996 | Musaka ............ | H01L 21/02274 427/574 |
| 6,110,988 A | * | 8/2000 | Lake .................... | C08F 290/067 522/75 |
| 6,114,447 A | * | 9/2000 | Lake .................... | C08L 101/12 525/104 |
| 6,258,441 B1 | * | 7/2001 | Oguchi ................ | C08F 259/08 428/141 |
| 6,376,922 B1 | * | 4/2002 | Lake .................... | C08L 101/12 257/787 |
| 6,522,023 B2 | * | 2/2003 | Lake .................... | C08L 101/12 257/787 |
| 9,988,556 B2 | * | 6/2018 | Weber .................. | C08K 5/17 |
| 10,308,834 B2 | * | 6/2019 | Weber .................. | C08F 290/061 |
| 2002/0106157 A1 | * | 8/2002 | Hu ......................... | B32B 18/00 385/37 |
| 2004/0135292 A1 | * | 7/2004 | Coats ..................... | B29C 64/40 264/401 |
| 2006/0205911 A1 | * | 9/2006 | Ludewig ............ | C08G 18/7837 528/44 |

FOREIGN PATENT DOCUMENTS

| | | |
|---|---|---|
| JP | 2009191097 | 8/2009 |
| KR | 19960022896 | 7/1996 |
| KR | 20080003529 | 1/2008 |
| KR | 20110078371 | 7/2011 |
| KR | 101501499 | 3/2015 |
| KR | 20170095787 | 8/2017 |
| WO | 2016071304 | 5/2016 |
| WO | 2017087436 | 5/2017 |

OTHER PUBLICATIONS

European Search Report—European Application No. 18194419.0 dated Feb. 13, 2019, citing WO 2017/087436, WO 2016/071304 and JP 2009 191097.

* cited by examiner

*Primary Examiner* — Sanza L. McClendon
(74) *Attorney, Agent, or Firm* — Cantor Colburn LLP

(57) ABSTRACT

Provided are an ultraviolet curable coating composition and an automobile part using the same. In an exemplary embodiment, the coating composition comprises a first urethane (meth)acrylate oligomer having 6 or more functional groups, a second urethane (meth)acrylate oligomer having 3 or more functional groups, a polyester (meth)acrylate oligomer, a hydroxy (meth)acrylate monomer having 3 or more functional groups, a multifunctional (meth)acrylate monomer having 3 or more functional groups, and a photopolymerization initiator, based on the total weight of the coating composition.

16 Claims, No Drawings

ULTRAVIOLET CURABLE COATING COMPOSITION

CROSS-REFERENCE TO RELATED APPLICATION

This application claims priority to and the benefit of Korean Patent Application No. 10-2017-0122262 filed on Sep. 22, 2017 in the Korean Intellectual Property Office, and all the benefits accruing therefrom under 35 U.S.C. 119, the contents of which in its entirety are herein incorporated by reference.

BACKGROUND

1. Field

The present invention relates to an ultraviolet curable coating composition and an automobile part using the same.

2. Description of the Related Art

A smart cruise control (SCC) is a constant-speed driving system or an automatic speed adjusting system for constantly maintaining a vehicle speed. Use of the SCC enables vehicle driving according to a speed limit or an economic driving speed without seeing a speedometer. The SCC is frequently used for long distance movement using highways rather than ordinary roads or national roadways with many signal controls encountered.

The SCC is an electronic device using radar and is generally mounted on a front surface of a vehicle to control a vehicle speed by identifying the position of a front obstacle of the vehicle from a controller. A radiator grill constituting the front surface of the vehicle is a part coated with a metal, such as aluminum (Al) or chrome (Cr), which may shield radar propagation generated from the SCC, disabling the SCC to perform its function properly. Accordingly, it is quite difficult to install the SCC inside the radiator grill of the vehicle.

To address this problem, there has been developed a method of mounting the SCC on an outer surface of a radiator grill and putting on an SCC cover made of transparent polycarbonate or acryl resin as a vehicle cladding for protecting the SCC. However, the SCC cover made of a transparent resin may spoil aesthetics of the vehicle, thereby narrowing down options in vehicle designs.

SUMMARY

The present invention provides an ultraviolet curable coating composition capable of forming a coating having a metallic texture, high permeability on radar propagation and excellent adhesiveness, water resistance, heat resistance, moisture resistance, and cold-heat resistance cyclability in an environmentally friendly manner, and an automobile part using the same.

The present invention provides an ultraviolet curable coating composition comprising 5 to 20% by weight of a first urethane (meth)acrylate oligomer having 6 or more functional groups, 5 to 20% by weight of a second urethane (meth)acrylate oligomer having 3 or more functional groups, 3 to 15% by weight of a polyester (meth)acrylate oligomer, 10 to 25% by weight of a hydroxy (meth)acrylate monomer having 3 or more functional groups, 5 to 20% by weight of a multifunctional (meth)acrylate monomer having 3 or more functional groups, and 1 to 10% by weight of a photopolymerization initiator, based on the total weight of the coating composition.

Further, the present invention provides an automobile part including a main body, and a coating layer formed on the main body, the coating layer made of the ultraviolet curable coating composition.

As described above, the ultraviolet curable coating composition according to the present invention is capable of forming a coating having a metallic texture, high permeability on radar propagation and excellent adhesiveness, water resistance, heat resistance, moisture resistance, and cold-heat resistance cyclability in an environmentally friendly manner.

DETAILED DESCRIPTION

Hereinafter, a preferred embodiment of the present invention will be described in detail. However, it will be understood that the present description is not intended to limit the invention to the following content, and when necessary, various components can be modified in various manners or can be optionally used together with each other. Therefore, the present invention is intended to cover all modifications, equivalents and alternatives, which may be included within the spirit and scope of the invention.

As used in this specification, the term "(meth)acrylate" refers to acrylate or methacrylate, the term "(meth)acryl" refers to acryl or methacryl, the term "(meth)acryloyl" refers to acryloyl or methacryloyl, and the term "polymerizable functional group" refers to a functional group involving in a polymerization reaction, e.g., a (meth)acrylate group.

<Ultraviolet (UV) Curable Coating Composition>

The UV curable coating composition according to the present invention comprises 5 to 20% by weight of a first urethane (meth)acrylate oligomer having 6 or more functional groups, 5 to 20% by weight of a second urethane (meth)acrylate oligomer having 3 or more functional groups, 3 to 15% by weight of a polyester (meth)acrylate oligomer, 10 to 25% by weight of a hydroxy (meth)acrylate monomer having 3 or more functional groups, 5 to 20% by weight of a multifunctional (meth)acrylate monomer having 3 or more functional groups, and 1 to 10% by weight of a photopolymerization initiator. When necessary, the ultraviolet curable coating composition according to the present invention may further comprise one or more additives including a sagging control agent, an adhesion promoter, a wetting/leveling agent, and so on.

Compositional materials of the UV curable coating composition will now be described in detail.

First Urethane (Meth)Acrylate Oligomer Having 6 or More Functional Groups

In the UV curable coating composition of the present invention, the first urethane (meth)acrylate oligomer having 6 or more functional groups is an urethane (meth)acrylate oligomer having 6 or more (6 to 10 as an example, 6 to 8 as another example, or 6 or 7 as still another example) polymerizable unsaturated functional groups. Such an oligomer can improve physical properties of a coating, including, for example, hardness, toughness, moisture resistance, cold-heat resistance cyclability, heat resistance, and so on, by forming a crosslinking structure with another reactive oligomer or photoreactive monomer while improving curability of the coating composition.

The first urethane (meth)acrylate oligomer may have a weight average molecular weight (Mw) in a range of, for example, about 500 to 2,000 g/mol. Alternatively, the first urethane (meth)acrylate oligomer may have a weight average molecular weight (Mw) in a range of about 800 to 1,500 g/mol. When the first urethane (meth)acrylate oligomer has a weight average molecular weight in the range stated above, the coating may exhibit excellent physical properties, including hardness, toughness, moisture resistance, cold-heat resistance cyclability, heat resistance, and so on. The first urethane (meth)acrylate oligomer may be used alone or in combination of two or more kinds.

The amount of the first urethane (meth)acrylate oligomer may be in the range of about 5 to 20% by weight based on the total weight of the coating composition. When the amount of the first urethane (meth)acrylate oligomer falls under the range stated above, the curability, moisture resistance, cold-heat resistance cyclability and heat resistance of the coating can be improved.

In the present invention, in order to improve the leveling property and workability of the composition and the adhesiveness and flexibility of the coating while improving the curability, moisture resistance, cold-heat resistance cyclability and heat resistance of the coating, the first urethane (meth)acrylate oligomer is used in combination with a second urethane (meth)acrylate oligomer having 3 or more functional groups and a polyester (meth)acrylate oligomer, which will later be described, as reactive oligomers.

Second Urethane (Meth)Acrylate Oligomer Having 3 or More Functional Groups

In the UV curable coating composition of the present invention, the second urethane (meth)acrylate oligomer having 3 or more functional groups is a urethane (meth)acrylate oligomer having 3 or more (3 to 5 as an example or 3 or 4 as another example) polymerizable unsaturated functional groups. Such an oligomer can improve the adhesiveness and flexibility of the coating.

The second urethane (meth)acrylate oligomer may have a weight average molecular weight (Mw) in a range of, for example, about 500 to 2,500 g/mol. Alternatively, the second urethane (meth)acrylate oligomer may have a weight average molecular weight (Mw) in a range of about 1,000 to 2,000 g/mol. When the second urethane (meth)acrylate oligomer has a weight average molecular weight in the range stated above, the coating may exhibit excellent adhesiveness and flexibility. The second urethane (meth)acrylate oligomer may be used alone or in combination of two or more kinds.

The amount of the second urethane (meth)acrylate oligomer may be in the range of about 5 to 20% by weight based on the total weight of the coating composition. When the amount of the second urethane (meth)acrylate oligomer falls under the range stated above, the adhesiveness and flexibility of the coating can be improved.

Polyester (Meth)Acrylate Oligomer

In the UV curable coating composition of the present invention, the polyester (meth)acrylate oligomer can improve the leveling property and workability of the composition and the adhesiveness of the coating.

Methods of manufacturing the polyester (meth)acrylate oligomer are not particularly limited. As an example, the polyester (meth)acrylate oligomer may be obtained from polymers or oligomers having both terminals of polyester diols synthesized using various raw materials converted into (meth)acrylic acid ester.

The polyester (meth)acrylate oligomer may have a weight average molecular weight (Mw) in a range of, for example, about 500 to 2,000 g/mol. Alternatively, the polyester (meth) acrylate oligomer may have a weight average molecular weight (Mw) in a range of, for example, about 800 to 1,800 g/mol. When the polyester (meth)acrylate oligomer has a weight average molecular weight in the range stated above, excellent workability is exhibited at the time of preparing a cured product, and excellent physical properties, such as heat resistance, moisture resistance and so on, are demonstrated. The polyester (meth)acrylate oligomer may be used alone or in combination of two or more kinds.

In the present invention, the amount of the polyester (meth)acrylate oligomer may be in the range of about 3 to 15% by weight based on the total weight of the coating composition. When the amount of the polyester (meth) acrylate oligomer falls under the range sated above, the adhesiveness of the coating can be improved by appropriately controlling a curing density as the leveling property and workability of the composition is improved, and physical properties, such as heat resistance, moisture resistance and so on, can be improved.

Hydroxy (Meth)Acrylate Monomer Having 3 or More Functional Groups

In the UV curable coating composition of the present invention, the hydroxy (meth)acrylate monomer having 3 or more functional groups is a (meth)acrylate monomer having hydroxy group(s) and 3 or more (3 to 6 as an example or 3 or 4 as another example) polymerizable unsaturated functional groups. Such a monomer can improve the curability and thickening ability of the composition and the crosslinking density, hardness, water resistance and blemish coverage of the coating, thereby minimizing material damages.

The hydroxy (meth)acrylate monomer may have a weight average molecular weight (Mw) in a range of, for example, about 200 to 400 g/mol. Alternatively, the hydroxy (meth) acrylate monomer may have a weight average molecular weight (Mw) in a range of, for example, about 270 to 330 g/mol. The curability, thickening ability and viscosity of the composition and the crosslinking density of the coating can be easily controlled when the hydroxy (meth)acrylate monomer has a weight average molecular weight in the range stated above.

Non-limiting examples of the hydroxy (meth)acrylate monomer include pentaerytritol tri(meth)acrylate, pentaerytritol tetra(meth)acrylate, ethoxylated pentaerytritol tetra(meth)acrylate, dipentaerytritol poly(meth)acrylate, and so on, and these materials can be used alone or in combination of two or more thereof.

The amount of the hydroxy (meth)acrylate monomer may be in the range of about 10 to 25% by weight based on the total weight of the coating composition. When the amount of the hydroxy (meth)acrylate monomer falls under the range stated above, the crosslinking density, hardness, water resistance, thickening ability, or blemish coverage of the coating can be improved without demonstrating poor external appearance, such as pinholes.

In the present invention, in order to improve the viscosity, leveling property, or workability of the composition or the adhesiveness or hardness of the coating, the hydroxy (meth) acrylate monomer and a multifunctional (meth)acrylate monomer, which will later be described, are used in combination as monomers.

Multifunctional (Meth)Acrylate Monomer Having 3 or More Functional Groups

In the UV curable coating composition of the present invention, the multifunctional (meth)acrylate monomer having 3 or more functional groups (to be referred to as a 'multifunctional (meth)acrylate monomer' hereinafter) is a (meth)acrylate monomer having 3 or more (3 to 6 as an example or 3 or 4 as another example) polymerizable unsaturated functional groups. The multifunctional (meth) acrylate monomer is a multifunctional (meth)acrylate monomer having 3 or more functional groups exclusive of the hydroxy (meth)acrylate monomer, that is, a hydroxy-free (meth)acrylate monomer having 3 or more functional groups. The multifunctional (meth)acrylate monomer can improve the adhesiveness of the coating while improving the flowability, leveling property and workability of the composition.

The multifunctional (meth)acrylate monomer may have a weight average molecular weight (Mw) in a range of, for example, about 200 to 400 g/mol. Alternatively, the multifunctional (meth)acrylate monomer may have a weight average molecular weight (Mw) in a range of about 270 to 330 g/mol. When the multifunctional (meth)acrylate monomer has a weight average molecular weight in the range stated above, the flowability, leveling property, workability, or viscosity of the composition and the crosslinking density of the coating may be easily controlled.

Non-limiting examples of the multifunctional (meth)acrylate monomer include trimethylolpropane tri(meth)acrylate, ethoxylated trimethylolpropane tri(meth)acrylate, propoxylated trimethylolpropane tri(meth)acrylate, ditrimethylolpropane tetra(meth)acrylate, and so on, and these materials can be used alone or in combination of two or more thereof.

The amount of the multifunctional (meth)acrylate monomer may be in the range of about 5 to 20% by weight based on the total weight of the coating composition. When the amount of the multifunctional (meth)acrylate monomer falls under the range stated above, the flowability, leveling property, workability, or viscosity of the composition and the crosslinking density or adhesiveness of the coating can be improved.

Photopolymerization Initiator

In the UV curable coating composition of the present invention, the photopolymerization initiator is excited by UV light to function to initiate photopolymerization and general photopolymerization initiators useful in the related art can be used without limitation.

Non-limiting examples of the useful photopolymerization initiators include, for example, Irgacure 184, Irgacure 369, Irgacure 651, Irgacure 819, Irgacure 907, benzionalkylether, benzophenone, benzyl dimethyl katal, hydroxycyclohexyl phenylacetone, chloroacetophenone, 1,1-dichloro acetophenone, diethoxy acetophenone, hydroxy acetophenone, 2-chloro thioxanthone, 2-ETAQ (2-ethyl anthraquinone), 1-hydroxy-cyclohexyl-phenyl-ketone, 2-hydroxy-2-methyl-1-phenyl-1-propanone, 2-hydroxy-1-[4-(2-hydroxyethoxy)phenyl]-2-methyl-1-propanone, methylbenzoylformate, and so on. These photopolymerization initiators can be used alone or in combination of two or more thereof.

Absorption wavelengths of the photopolymerization initiator are not particularly limited so long as they are capable of absorbing UV light, and may be in the range of, for example, about 240 to 340 nm.

The amount of the photopolymerization initiator may be in the range of about 1 to 10% by weight based on the total weight of the coating composition. When the amount of the photopolymerization initiator is less than about 1% by weight, the curability may be lowered or the curing may not occur, resulting in deteriorations of hardness and adhesiveness of the coating and causing wrinkles due to uncured coating. When the amount of the photopolymerization initiator is greater than about 10% by weight, the unreacted photopolymerization initiator may cause contamination or a low polymerization degree may degrade the adhesiveness of the coating.

Solvent

The UV curable coating composition according to the present invention may further include a solvent. Any kind of the solvent can be used without particular limitation so long as it is capable of controlling the viscosity at a low level while capable of dissolving ingredients including, for example, urethane (meth)acrylate oligomers, polyester (meth)acrylates, or the like. Examples of the solvent include ketone-based solvents, ester-based solvents, ether-based solvents, alcohol-based solvents or combinations thereof. Non-limiting examples of the solvent include propylene glycol methyl ether, toluene, xylene, methylethylketone, methylpropylketone, methylbutylketone, methylisobutylketone, ethylpropylketone, methylacetate, ethylacetate, n-propylacetate, isopropylacetate, butylacetate, methylcellosolve acetate, cellosolve acetate, butylcellosolve acetate, carbitol acetate, methanol, ethanol, n-propanol, isopropanol, n-buthanol, isobuthanol, tertiary buthanol, benzene, acetone, tetrahydrofuran, dimethylformaldehyde, cyclohexanone, etc, but not limited thereto. These materials may be used alone or in combination of two or more thereof.

The amount of the solvent used is not particularly limited and may be the remainder controlling the total amount of the coating composition to be 100% by weight. As an example, the amount of the solvent may be in the range of about 30 to 50% by weight based on the total weight of the coating composition.

Additives

Optionally, the UV curable coating composition according to the present invention may further include additives generally known in the related art in addition to the aforementioned substances according to the use purpose and environment.

As an example, the UV curable coating composition may further include one or more additives selected from the group consisting of a sagging control agent, an adhesion promoter, and a wetting/leveling agent.

In the UV curable coating composition according to the present invention, the sagging control agent is an ingredient for controlling the flowability of a coating composition. When the composition according to the present invention is employed to various types of plastic materials, it is possible to prevent wrinkles of pooling from being generated on the external appearance of the coating. The sagging control agent is not particularly limited so long as it is generally used in the art to control the flowability of the coating composition.

The sagging control agent may include, for example, cellulose acetate butyrate, but not limited thereto. As an example, cellulose acetate butyrate containing about 40 to 60% by weight of butyryl group and about 0.5 to 5% by weight of acetyl group, based on the total weight of the polymer, can be used as the sagging control agent. The cellulose acetate butyrate may have a melting point in a range of about 130 to 140° C., and a glass transition temperature (Tg) in a range of about 90 to 110° C.

In the composition according to the present invention, the amount of the sagging control agent used is not particularly limited and may be in a range of, for example, about 0.1 to 5% by weight, based on the total weight of the composition according to the present invention. When the amount of the sagging control agent falls under the range stated above, functionality of the sagging control agent can be easily exhibited, thereby improving the flowability of the coating composition, and the sagging control agent has superior compatibility with other ingredients, thereby demonstrating an improved leveling property without causing white turbidity of the coating.

In the UV curable coating composition according to the present invention, the adhesion promoter can improve the adhesiveness of the UV curable coating composition. Non-limiting examples of the useful adhesion promoter include ether-based adhesion promoters. Examples of the ether-based adhesion promoters include silicone-free modified polyether, etc. As an example, the silicone-free modified polyether may have a density (20° C.) of about 0.9 to 0.99 g/ml and may include non-volatile matter (10 min, 150° C.) of about 45 to 60%.

The amount of the adhesion promoter may be appropriately controlled within the range known in the art. As an example, the amount of the adhesion promoter may be about 0.5 to 5% by weight based on the total weight of the coating composition. When the amount of the adhesion promoter falls under the range stated above, a desired adhesiveness improving effect can be attained without haze generation.

In the UV curable coating composition according to the present invention, the wetting/leveling agent can improve the leveling property, adhesiveness, recoatability and heat resistance of the coating. Non-limiting examples of the useful wetting/leveling agent include polyether-based silicone compounds. Examples of the polyether-based silicone compounds include polyether modified polydimethylsiloxane. As an example, the polyether modified polydimethylsiloxane may have a density (20° C.) of about 0.9 to 0.99 g/ml and may include non-volatile matter (30 min, 150° C.) of about 5 to 20%.

The amount of the wetting/leveling agent is not particularly limited and may be in a range of, for example, about 0.1 to 5% by weight, based on the total weight of the composition according to the present invention. When the amount of the wetting/leveling agent falls under the range stated above, excellent external appearance, adhesiveness or recoatability can be demonstrated.

The UV curable coating composition according to the present invention may further include ingredients generally added thereto as other additives, including, for example, a UV stabilizer (e.g., HALS), an antioxidant (e.g., a phenol-based antioxidant), a defoaming agent, and so on, in addition to the sagging control agent, the adhesion promoter and the wetting/leveling agent. The amounts of other additives are not particularly limited and may be in a range of, for example, about 0.1 to 10% by weight respectively, based on the total weight of the composition according to the present invention.

Methods of manufacturing the composition according to the present invention are not particularly limited. As an example, the composition according to the present invention may be manufactured by a general method in which the aforementioned substances are input to mixing equipment, such as a dissolver or a stirrer, with additives, and then mixed at an appropriate temperature (e.g., at room temperature). The viscosity of the manufactured composition is not particularly limited but may be in a range of about 11 to 13 seconds (ASTM D1200/Ford cup #4, 25° C.).

The UV curable coating composition according to the present invention can be employed to various types of base materials, for example, plastic materials, but not limited thereto. According to an example embodiment, the UV curable coating composition according to the present invention is applied to a surface of a base material and then dried, followed by being cured by UV radiation, thereby forming a coating. As described above, the UV curable coating composition according to the present invention is employed to an automobile part (e.g., a vehicle cladding, an SCC cover of vehicle, etc.) to provide a metallic texture in an environmentally friendly manner. In addition, the composition has a low viscosity to provide excellent workability and an improved leveling property.

<Automobile Part>

The present invention provides an automobile part using the UV curable coating composition.

In an example embodiment, the automobile part includes a main body and a coating layer formed on the main body using the UV curable coating composition. A metal deposition film may further be formed on the coating layer. A deposition method generally used in the related art (e.g., sputtering deposition) may be used, and non-limiting examples of the useful metal include indium, chrome or a combination thereof.

The main body is formed by, for example, injection-molding a transparent resin in a predetermined shape. The transparent resin that is usable in the present invention is not particularly limited so long as it has high optical, electromagnetic permeability, specifically radar propagation permeability. Examples of the transparent resin include ASA resin (acrylic-styrene-acrylonitrile resin), polycarbonate resin, acryl resin, ABS resin (acrylonitrile-butadiene-styrene resin), and so on, but not limited thereto.

The coating layer is a part that exhibits an excellent gloss by providing the main body with a metallic texture, and has excellent radar propagation permeability and high adhesiveness with respect to not only the main body but a deposition film made of indium, chrome or aluminum, a UV layer, or a urethane top coating. In addition, the coating layer has excellent physical properties, including hardness, water resistance, heat resistance, or cold-heat resistance cyclability, and is good in external appearance without pinholes or cracks. In addition, the coating may not be tarnished or discolored even with long-time exposure to UV light. Further, discoloration, tarnishing, swelling, or cracks may not occur to the coating even under high temperature and/or high humidity environments.

The thickness of the coating layer dried is not particularly limited and may be in a range of, for example, about 20 to 25 μm.

The method of forming the coating layer is not particularly limited so long as it is a coating method for a plastic material generally used in the related art. Examples of the coating method include spray coating, deep coating, and so on.

Examples of the automobile part include a vehicle cladding (e.g., SCC cover). The automobile part is not particularly limited so long as it is an automobile part requiring a coating layer having a metallic texture using the UV curable coating composition according to the present invention.

The present invention will be described in more detail with reference to examples and comparative examples, and the following examples and comparative examples are provided only for illustrating the present invention, not for limiting the protection scope of the present invention.

Examples 1-6

Raw materials constituting the UV curable coating composition according to the present invention have the following specification, as listed in Table 1 below.

TABLE 1

| Component | Material | Raw material specification |
|---|---|---|
| a | Hexafunctional aliphatic urethane acrylate | Mw: 1,000 g/mol<br>Viscosity: 100,000 cps@25° C. |
| b | Trifunctional aliphatic urethane triacrylate | Mw: 1,500 g/mol<br>Viscosity: 70,000 cps@25° C. |
| c | Tetrafunctional polyester acrylate | Mw: 1,300 g/mol<br>Viscosity: 5,000 cps@25° C. |
| d | Pentaerythritol triacrylate | Mw: 298 g/mol<br>Viscosity: 1,400 cps@25° C. |
| e | Trimethylolpropane triacrylate | Mw: 296 g/mol<br>Viscosity: 100 cps@25° C. |
| f | 1-Hydroxycyclohexyl phenyl ketone | MAX UV Absorption:<br>243 nm, 331 nm |
| g | Butyl Acetate | — |
| h | Solution of a polyether-modified polydimethylsiloxane | Density(20° C.): 0.93 g/ml,<br>Non-volatile matter<br>(30 min, 150° C.): 12.5% |

According to the compositional materials listed in Table 2 below, the UV curable coating compositions of Examples 1-6 were manufactured using first urethane (meth)acrylate oligomers, second urethane (meth)acrylate oligomers, polyester (meth)acrylate oligomers, hydroxy (meth)acrylate monomers, multifunctional (meth)acrylate monomers, photopolymerization initiators, additives, and solvents. In Table 2, the respective compositions are used in amounts indicated by percent (%) by weight.

TABLE 2

| Component | Example 1 | Example 2 | Example 3 | Example 4 | Example 5 | Example 6 |
|---|---|---|---|---|---|---|
| a | 10 | 12.5 | 20 | 5 | 10 | 10 |
| b | 10 | 12.5 | 5 | 20 | 14 | 14 |
| c | 10 | 5 | 5 | 5 | 6 | 6 |
| d | 25 | 25 | 25 | 25 | 20 | 15 |
| e | 5 | 5 | 5 | 5 | 10 | 15 |
| f | 5 | 5 | 5 | 5 | 5 | 5 |
| g | 34 | 34 | 34 | 34 | 34 | 34 |
| h | 1 | 1 | 1 | 1 | 1 | 1 |

Comparative Examples 1-9

According to the compositional materials listed in Table 3 below, the UV curable coating compositions of Comparative Examples 1-9 were manufactured using first urethane (meth)acrylate oligomers, second urethane (meth)acrylate oligomers, polyester (meth)acrylate oligomers, hydroxy (meth)acrylate monomers, multifunctional (meth)acrylate monomers, photopolymerization initiators, additives, and solvents. In Table 3, the respective compositions are used in amounts indicated by percent (%) by weight.

TABLE 3

| | Comparative Example | | | | | | | | |
|---|---|---|---|---|---|---|---|---|---|
| Component | 1 | 2 | 3 | 4 | 5 | 6 | 7 | 8 | 9 |
| a | 15 | 15 | — | 10 | 30 | — | — | 24 | 3 |
| b | 15 | — | 15 | 14 | — | 30 | — | 4 | 22 |
| c | — | 15 | 15 | 6 | — | — | 30 | 2 | 15 |
| d | 25 | 25 | 25 | — | 25 | 25 | 25 | 15 | 10 |
| e | 5 | 5 | 5 | 30 | 5 | 5 | 5 | 15 | 10 |
| f | 5 | 5 | 5 | 5 | 5 | 5 | 5 | 5 | 5 |
| g | 34 | 34 | 34 | 34 | 34 | 34 | 34 | 34 | 34 |
| h | 1 | 1 | 1 | 1 | 1 | 1 | 1 | 1 | 1 |

Experimental Examples: Evaluation of Physical Properties

To evaluate physical properties of the coatings formed using the UV curable coating compositions prepared in Examples 1-6 and Comparative Examples 1-9, physical property tests were carried out according to the following measurement methods and the results thereof are indicated in Tables 4 and 5. Here, each test piece was prepared by applying a coating composition to a polycarbonate base material (thickness: 20 μm) and is then subjected to photocuring (Irradiated at 50° C. for 3 min before curing, light amount: 1,000 mJ/cm$^2$, light intensity: 170 mW/cm$^2$).

(1) External Appearance

Tarnishing, gloss degradation, sagging resistance, orange peel of each test piece were observed by naked eye, and the external appearance of each test piece was evaluated according to the following ratings:

○: Good; Δ: Poor; x: NG (not good)

(2) Material Damages

After UV curing, damages caused to each test piece were observed by naked eye and the external appearance of each test piece was evaluated according to the following ratings:

○: Clear; Δ: Subtle haze partially observed; x: Haze observed (3) Adhesiveness

A cross cut tape test was performed according to the ASTM D3359 standard, and the adhesiveness was evaluated according to the following ratings:

○: M-1.0 to M-2.5; Δ: M-3.0 to M-3.5; x: M-4.0 to M-6.0

(4) Heat Resistance

Each test piece was left under the condition of test temperature (120±2° C.) for 240 hours, and then left at room temperature for one hour. Tarnishing, discoloration, swelling, cracks, gloss degradation, and peeling of each test piece were observed, and the heat resistance was evaluated according to the following ratings:

○: Adhesive M-1.0 to M-2.5; Δ: Adhesive M-3.0 to M-3.5; x: Adhesive M-4.0 to M-6.0

(5) Moisture Resistance

Each test piece was left under the conditions of test temperature (50±2° C.) and relative humidity (98±2%) for 240 hours, and then left at room temperature for one hour. Tarnishing, discoloration, swelling, cracks, gloss degradation, and peeling of each test piece were observed, and the moisture resistance was evaluated according to the following ratings:

○: Adhesive M-1.0 to M-2.5; Δ: Adhesive M-3.0 to M-3.5; x: Adhesive M-4.0 to M-6.0

(6) Cold-Heat Resistance Cyclability

Each test piece was left under the conditions of test temperature (80±2° C.) and relative humidity (95%) for 4 hours, and the temperature and relative humidity conditions were then changed to −40±2° C. and 95%, respectively. Then, the test piece was left for 4 hours under the changed test conditions. The above procedure was repeated 5 times, and the resultant test piece was left at room temperature for one hour. Then, tarnishing, discoloration, swelling, cracks, gloss degradation, and peeling of each test piece were observed, and the cold-heat resistance cyclability was evaluated according to the following ratings:

○: Adhesive M-1.0 to M-2.5; Δ: Adhesive M-3.0 to M-3.5; x: Adhesive M-4.0 to M-6.0

TABLE 4

| | Example 1 | Example 2 | Example 3 | Example 4 | Example 5 | Example 6 |
|---|---|---|---|---|---|---|
| External appearance | ○ | ○ | ○ | ○ | ○ | ○ |
| Material damage | ○ | ○ | ○ | ○ | ○ | ○ |
| Adhesiveness | ○ | ○ | ○ | ○ | ○ | ○ |
| Heat resistance | ○ | Δ | Δ | ○ | ○ | ○ |
| Moisture resistance | Δ | ○ | ○ | Δ | ○ | ○ |
| Cold-heat resistance cyclability | ○ | ○ | ○ | ○ | ○ | ○ |

TABLE 5

| | Comparative Example | | | | | | | | |
|---|---|---|---|---|---|---|---|---|---|
| | 1 | 2 | 3 | 4 | 5 | 6 | 7 | 8 | 9 |
| External appearance | Δ | Δ | ○ | X | Δ | ○ | ○ | Δ | Δ |
| Material damage | Δ | Δ | Δ | ○ | X | Δ | Δ | Δ | Δ |
| Adhesiveness | Δ | ○ | ○ | ○ | Δ | ○ | ○ | X | Δ |
| Heat resistance | ○ | Δ | Δ | Δ | ○ | ○ | X | X | Δ |
| Moisture resistance | Δ | X | X | Δ | Δ | X | Δ | X | X |
| Cold-heat resistance cyclability | Δ | ○ | X | ○ | ○ | Δ | Δ | X | X |

What is claimed is:

1. An ultraviolet curable coating composition comprising:
   5 to 20% by weight of a first urethane (meth)acrylate oligomer having 6 or more functional groups;
   5 to 20% by weight of a second urethane (meth)acrylate oligomer having 3 to 5 functional groups;
   3 to 15% by weight of a polyester (meth)acrylate oligomer;
   10 to 25% by weight of a hydroxy (meth)acrylate monomer having 3 or more functional groups;
   5 to 20% by weight of a multifunctional (meth)acrylate monomer having 3 or more functional groups; and
   1 to 10% by weight of a photopolymerization initiator, based on the total weight of the coating composition.

2. The ultraviolet curable coating composition of claim 1, wherein the first urethane (meth)acrylate oligomer has a weight average molecular weight (Mw) in a range of 500 to 2,000 g/mol.

3. The ultraviolet curable coating composition of claim 1, wherein the second urethane (meth)acrylate oligomer has a weight average molecular weight in a range of 500 to 2,500 g/mol.

4. The ultraviolet curable coating composition of claim 1, wherein the polyester (meth)acrylate oligomer has a weight average molecular weight in a range of 500 to 2,000 g/mol.

5. The ultraviolet curable coating composition of claim 1, wherein the hydroxy (meth)acrylate monomer has a weight average molecular weight in a range of 200 to 400 g/mol.

6. The ultraviolet curable coating composition of claim 1, wherein the multifunctional (meth)acrylate monomer has a weight average molecular weight in a range of 200 to 400 g/mol.

7. The ultraviolet curable coating composition of claim 1, wherein the photopolymerization initiator has an absorption wavelength in a range of 240 nm to 340 nm.

8. The ultraviolet curable coating composition of claim 1, further comprising one or more additives selected from the group consisting of a sagging control agent, an adhesion promoter and a wetting/leveling agent.

9. An automobile part comprising:
   a main body; and
   a coating layer formed on the main body, the coating made of the ultraviolet curable coating composition comprising
   5 to 20% by weight of a first urethane (meth)acrylate oligomer having 6 or more functional groups;
   5 to 20% by weight of a second urethane (meth)acrylate oligomer having 3 to 5 functional groups;
   3 to 15% by weight of a polyester (meth)acrylate oligomer;
   10 to 25% by weight of a hydroxy (meth)acrylate monomer having 3 or more functional groups;
   5 to 20% by weight of a multifunctional (meth)acrylate monomer having 3 or more functional groups; and
   1 to 10% by weight of a photopolymerization initiator, based on the total weight of the coating composition.

10. The automobile part of claim 9, wherein the first urethane (meth)acrylate oligomer has a weight average molecular weight (Mw) in a range of 500 to 2,000 g/mol.

11. The automobile part of claim 9, wherein the second urethane (meth)acrylate oligomer has a weight average molecular weight in a range of 500 to 2,500 g/mol.

12. The automobile part of claim 9, wherein the polyester (meth)acrylate oligomer has a weight average molecular weight in a range of 500 to 2,000 g/mol.

13. The automobile part of claim 9, wherein the hydroxy (meth)acrylate monomer has a weight average molecular weight in a range of 200 to 400 g/mol.

14. The automobile part of claim 9, wherein the multifunctional (meth)acrylate monomer has a weight average molecular weight in a range of 200 to 400 g/mol.

15. The automobile part of claim 9, wherein the photopolymerization initiator has an absorption wavelength in a range of 240 nm to 340 nm.

16. The automobile part of claim 9, wherein the ultraviolet curable coating composition further comprises one or more additives selected from the group consisting of a sagging control agent, an adhesion promoter and a wetting/leveling agent.

* * * * *